US006993330B2

(12) United States Patent
Chong

(10) Patent No.: US 6,993,330 B2
(45) Date of Patent: Jan. 31, 2006

(54) METHOD AND APPARATUS FOR REMOTELY PERFORMING TASKS IN A WIRELESS PERSONAL DIGITAL ASSISTANT

(75) Inventor: Yih Yeong Chong, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 648 days.

(21) Appl. No.: 10/170,878

(22) Filed: Jun. 13, 2002

(65) Prior Publication Data

US 2003/0157946 A1 Aug. 21, 2003

(30) Foreign Application Priority Data

Feb. 20, 2002 (SG) ......................................... 200201091

(51) Int. Cl.
*H04Q 3/00* (2006.01)
*H04L 29/06* (2006.01)

(52) U.S. Cl. .................... 455/422.1; 709/246; 455/466; 455/66.1

(58) Field of Classification Search ................. 455/466, 455/422, 66.1; 709/246

See application file for complete search history.

(56) References Cited

U.S. PATENT DOCUMENTS

| 5,809,415 A | * | 9/1998 | Rossmann ............... 455/422.1 |
| 6,188,909 B1 | | 2/2001 | Alanara et al. |
| 2002/0049858 A1 | * | 4/2002 | Frietas et al. ............... 709/246 |
| 2002/0187795 A1 | * | 12/2002 | Jeong ......................... 455/466 |
| 2004/0229569 A1 | * | 11/2004 | Franz ........................ 455/66.1 |

FOREIGN PATENT DOCUMENTS

| EP | 0917038 | 5/1999 |
| EP | 1170969 | 1/2002 |
| EP | 1445917 A2 * | 8/2005 |
| WO | WO 01/15462 A1 * | 3/2001 |

* cited by examiner

*Primary Examiner*—William D. Cumming

(57) ABSTRACT

A method and apparatus for remotely performing tasks in a wireless personal digital assistant (PDA) by a user is provided. A user can perform tasks, such as, retrieving information and locking the PDA, by sending a controlling or special SMS message to the PDA. The special SMS message has a predetermined format which describes at least a task required and a user-input password. According to the needs of the task, the special SMS message may also include a source or an identifier from which the information is to be retrieved, and a destination to which the retrieved information is to be sent. The retrieved information may be sent as an SMS message or an electronic mail message or both.

12 Claims, 3 Drawing Sheets

METHOD AND APPARATUS FOR REMOTELY PERFORMING TASKS IN A WIRELESS PERSONAL DIGITAL ASSISTANT

BACKGROUND OF THE INVENTION

1. Field of the Invention

The present invention relates to wireless Personal Digital Assistants (PDAs). More particularly, the invention relates to a method and an apparatus for remotely performing tasks in a wireless PDA by a user.

2. Description of Background Information

PDAs have become indispensable to many people for their everyday needs, which include storing appointment information, managing electronic mail messages and word processing. In recent years, wireless PDAs have integrated wireless and personal information management capabilities to allow ready access to information while on the go.

PDAs have also become a trusted necessity for storing confidential information like bank accounts, passwords and documents containing sensitive information. Existing PDAs provide password-protect features to ensure that only the authorized user will be able to access the PDA. Such features include password-protecting the device upon timeout, or password-protecting folders or files. However, many users do not activate password protection, as they do not like to be inconvenienced by recurring password prompts. When the PDA is lost, a finder of the PDA will be able to access sensitive information for possible malicious intent. Thus, there is a need to remotely access and lock a wireless PDA when it is lost.

At times when a user does not have his wireless PDA with him, he may need to access information from his PDA or lock his PDA from unauthorized users. Information from his PDA is infeasible if the PDA is not in a location proximate to him.

Accordingly, there is a need for a method and an apparatus for remotely performing tasks in a wireless device by a user.

SUMMARY OF THE INVENTION

The present invention comprises a method and an apparatus for remotely performing tasks in a wireless PDA. Some tasks include (1) password-locking the wireless PDA and (2) retrieving information from the wireless PDA and sending it to another device.

When a user wants to remotely perform a task in a wireless PDA, he sends a special Short Message Service (SMS) message to the wireless PDA. The special SMS message contains at least a predefined character sequence (or header), which describes the task required, and a user-input password. Depending on the tasks, parameters like source, filename and destination may also be required from the user. After the wireless PDA device receives an SMS message, the message type is determined. If the SMS message is a normal SMS message, contents of the message are displayed in a manner known to a person skilled in the art. If the SMS message is a special SMS message, it is validated on parameters, e.g., password, contained in the message. If the parameters are valid, a task is performed at the PDA according to the contents in the special SMS message, e.g., retrieving information. The retrieved information can then be sent back to the remote user as an SMS message or as an electronic mail message or both.

DETAILED DESCRIPTION

Figure 1:
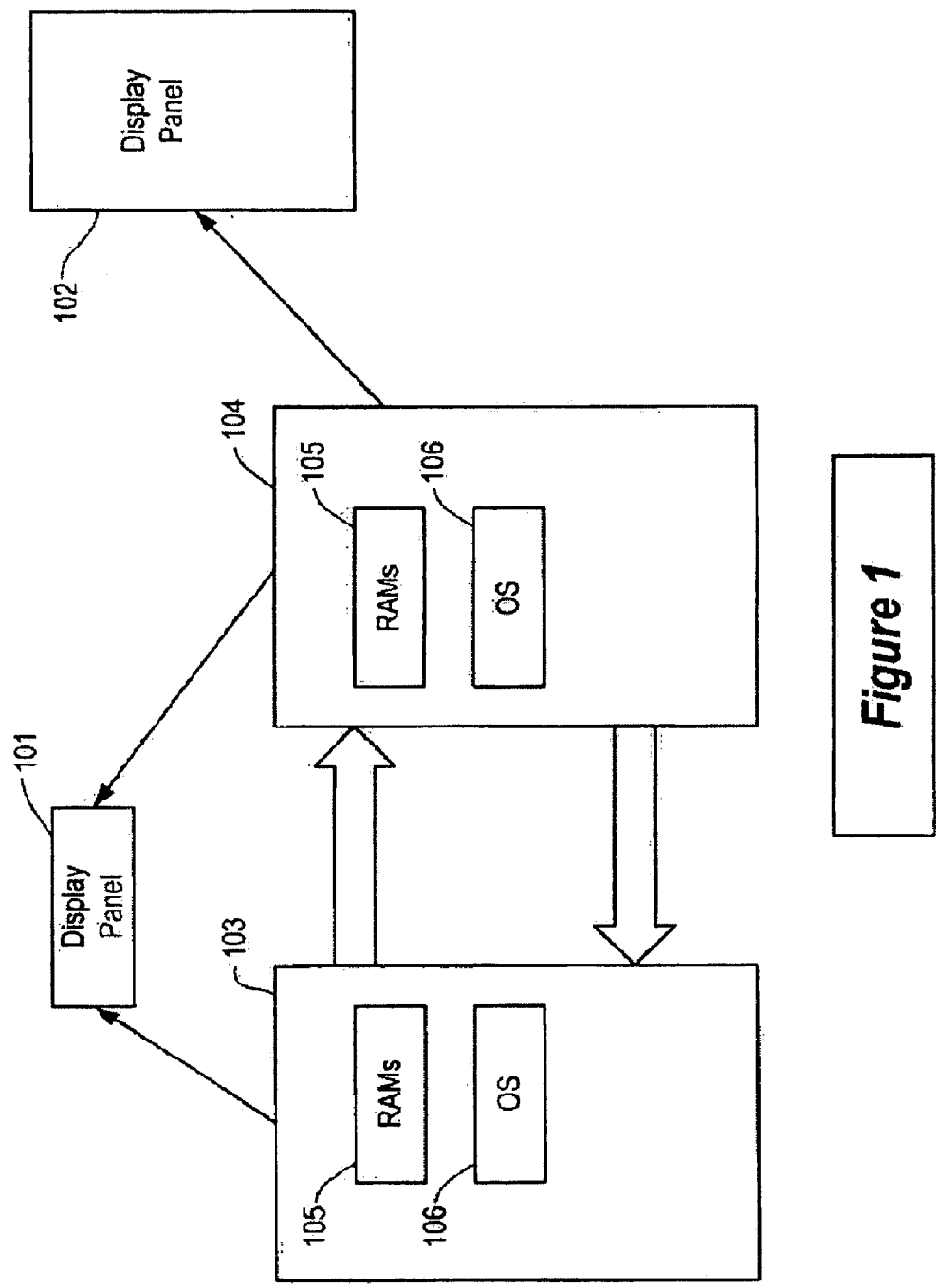
FIG. 1 is a representation of a wireless module and a PDA module in a wireless PDA.

In accordance with the present invention, a wireless PDA has a wireless module 103 for providing communication capabilities and a computing module 104 for providing PDA computing capabilities. Each module includes a microprocessor that handles activities for its respective module. The wireless module 103 and the computing module 104 may also have separate random access memories (RAMs) 105, operating systems (OS) 106, display panels 101, 102, and data caches. Both modules may share resources such as a display panel 101, a keyboard, speakers and microphones. Each respective module may utilize shared resources or communicate with the other module by events and commands in a manner known in the art. In the following description, the present invention is implemented on a computing module 104 operating on a Windows® CE Operating System. A representation of both the wireless 103 and computing module 104 is shown in FIG. 1.

Figure 2:
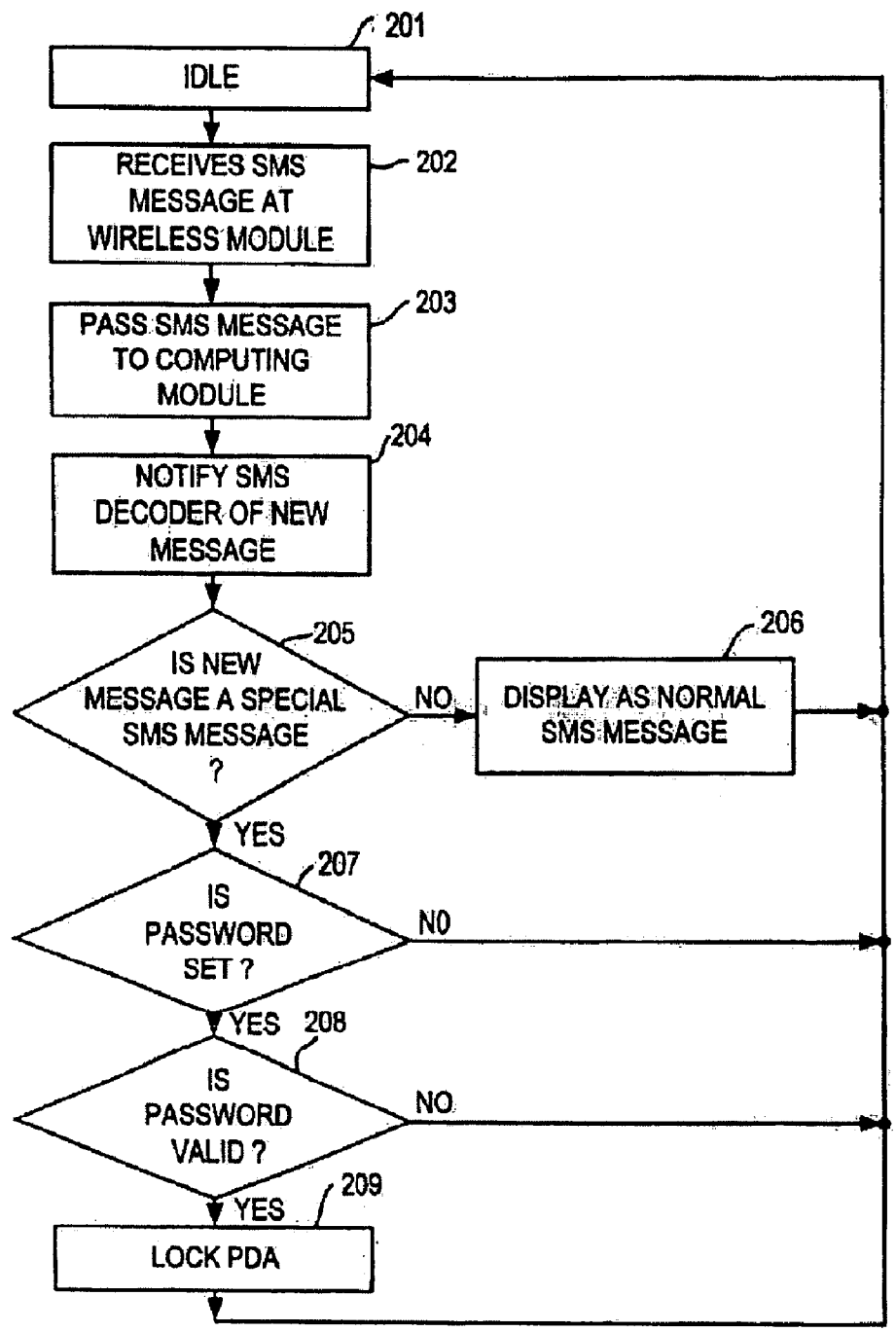
FIG. 2 is a flowchart describing a first embodiment of the present invention.

Reference is now made to FIG. 2. A wireless PDA is in an idle or ready state in step 201, where it is ready to receive SMS messages and calls. Step 201 proceeds to step 202 when an SMS message is received by the wireless module 103. Step 202 then proceeds to step 203, where the SMS message is passed from the wireless module 103 to the computing module 104. Within the computing module 104, the SMS message is received and stored in a Pocket Inbox application provided by Windows® CE Operating System. Step 203 proceeds to step 204, where an SMS decoder program is notified of the new SMS message in the Pocket Inbox application. Step 204 then proceeds to a decision step 205, where the SMS decoder program residing in a memory of the computing module 104 checks whether the SMS is a special message or not.

An example of a special message for locking a PDA has a format "HPREMOTELOCK:[OS-password]". "HPREMOTELOCK" is a predefined header (or character sequence) that makes up part of the text body of a special SMS message. The contents of the header determine the tasks to be performed by the wireless PDA. "[OS-password]" contains a user-input password for validating against the actual password to activate the locking feature. In a decision step 205, the decoder checks whether the SMS message is a special message or not by checking the header against a predetermined list of headers. If the header of the SMS message does not match any of the header in the predetermined list, step 205 proceeds to step 206, where the SMS message is handled as a normal text message and the contents of the SMS message are displayed. If the SMS message contains a header that matches a predetermined header, step 205 proceeds to step 207, where the SMS message is handled as a special message.

In an example where a special SMS message "HPREMOTELOCK:1234" has been received, step 205 proceeds to a decision step 207. In step 207, the computing module 104 checks whether any password has been set for the computing module 104. If no password has been set, step 207 proceeds to step 201, where the wireless PDA returns to an idle or ready state for receiving messages or calls, and the PDA is not locked. If a password has been set, step 205 proceeds to a decision step 208, where the user-input password is validated against the password set in the computing module 104. If the user-input password is invalid, step 208 proceeds to step 201, where the PDA returns to an idle state and the PDA is not locked. If the user-input password is valid, step 208 proceeds to step 209, where an event is triggered to lock the computing module 104. Optionally, the computing module 104 can be switched off. Optionally, a pop-up screen may be displayed to prompt the user for a password for unlocking the PDA.

Optionally, the present invention may also be configured to lock the wireless module 103 when the computing module 104 is locked in this manner.

In a second embodiment of the present invention, a special SMS message is used to retrieve information from a wireless PDA. The retrieved information is then returned as an SMS message to the sender of the special SMS message or to another destination. Information that can be retrieved includes contact information, calendar information, bank account number, files, documents, and the like. For this purpose, he may use the present invention as described below.

An example of an SMS message format for retrieving contact information is "HPRETRIEVECONTACT:[OS-password][Name of contact]". Similar to the foregoing description, "HPRETRIEVECONTACT" is a header of a special message predefined for retrieving contact information. Similarly, "[OS-password]" contains a user-input password. "[Name of contact]" contains the name of the contact whose information is required by the user, and identifies a source from which information is to be retrieved.

Figure 3:
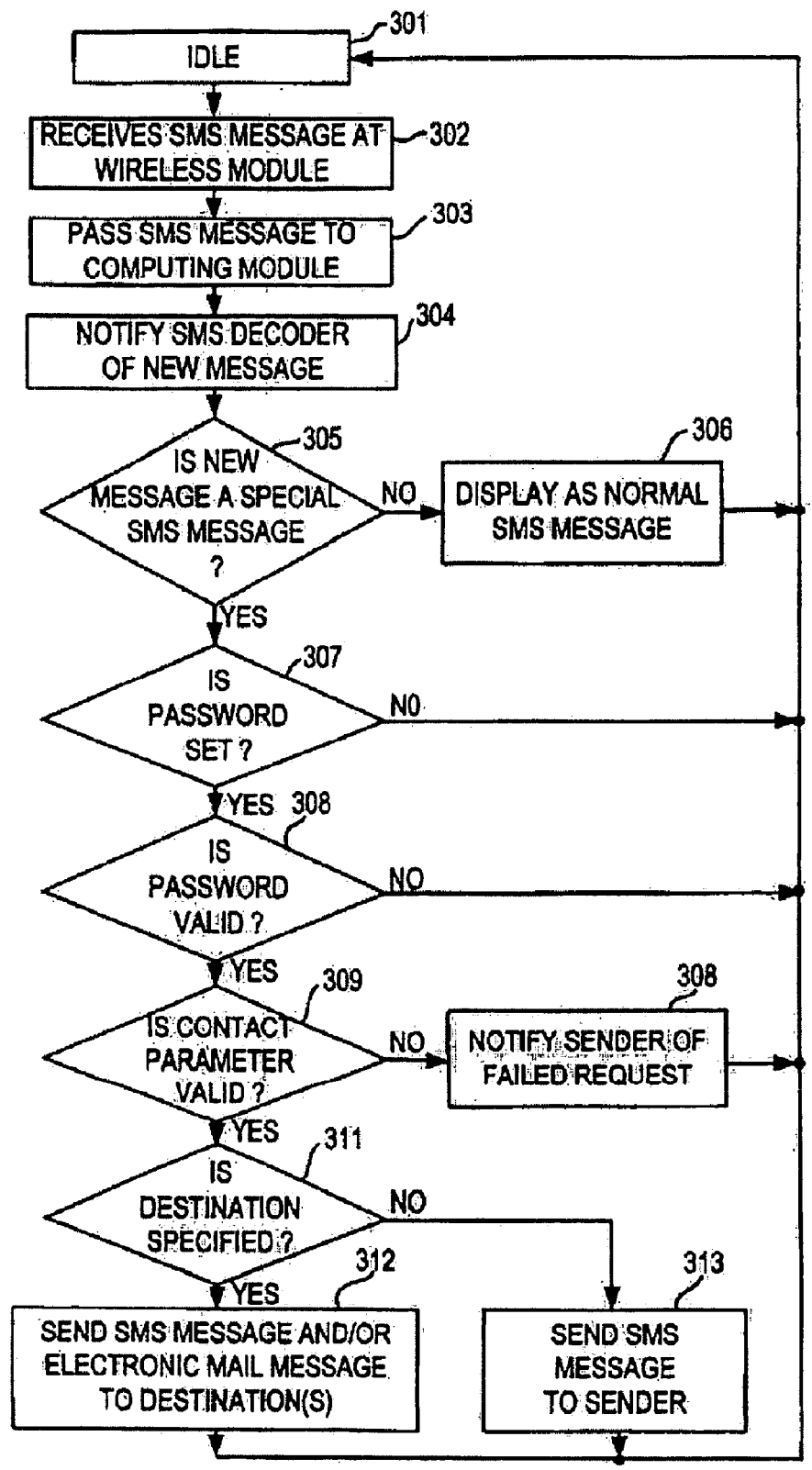
FIG. 3 is a flowchart describing a second embodiment of the present invention.

Reference is now made to FIG. 3, which shows a flowchart of the second embodiment. A wireless PDA is in an idle state in step 301, where it is ready to receive SMS messages and calls. Step 301 proceeds to step 302, where an SMS message is received by the wireless module 103. Step 302 then proceeds to step 303, where the SMS message is passed from the wireless module 103 to the computing module 104. Within the computing module 104, the SMS message is received and stored in a Pocket Inbox application. Step 303 then proceeds to step 304, where an SMS decoder program is notified of the new SMS message in the Pocket Inbox application. Step 304 proceeds to a decision step 305, where the SMS decoder program residing in a memory module of the computing module 104 checks whether the SMS is a special message. The decoder does this by checking the header of an SMS message against a predetermined list of headers. If the header of the SMS message does not match any of the header in the predetermined list, step 305 proceeds to step 306, where the SMS message is handled as a normal text message and the contents are displayed. If the SMS message contains a header that matches a predetermined header, step 305 proceeds to step 307, where the message is handled as a special message.

In an example, a special message "HPRETRIEVECONTACT:1234:John" is received. The header "HPRETRIEVECONTACT" matches with a predetermined header and step 305 proceeds to step 307. In step 307, the computing module 104 checks whether any password has been set. If no password has been set, step 307 proceeds to step 301, where the PDA returns to an idle state and there is no action, i.e., the computing module 104 does not retrieve contact information. Optionally, a return SMS message may be sent to notify the sender of a failed request. If a password has been set, step 307 proceeds to step 308, where the user-input password is validated against the password set in the computing module 104. If the user-input password is invalid, step 308 proceeds to step 301, where there is no action. If the user-input password is valid, step 308 proceeds to a decision step 309, where the presence of a contact entry "John" is checked. If the contact database does not contain an entry "John" as a complete or a partial entry, decision step 309 proceeds to step 310. In step 310, a return SMS message is sent to the sender to notify him of a failed request, i.e., that the requested contact cannot be located in the contact database. Thereafter, step 310 proceeds to 301, where there is no action and the wireless PDA is ready to receive SMS messages and calls. If the contact database contains an entry "John", decision step 309 proceeds to a decision step 311. In step 311, the presence of a destination is checked. If there is no destination specified in the special SMS message, step 311 proceeds to 313, where the contact information of "John" is retrieved, passed to the wireless module 103 and thereafter sent as an SMS message in a manner known to a person skilled in the art. The retrieved information is then sent to the sender of the special message. Thereafter, step 313 proceeds to step 301, where the wireless PDA is ready to receive SMS messages and calls. If at least one destination is specified in the special SMS message, step 311 proceeds to step 312, where the retrieved information is sent by SMS to the destination(s) specified. An example of a special SMS message containing a destination is "HPRETRIEVECONTACT:1234:John:94567890".

Optionally, the retrieved information can be sent as an electronic mail message in step 312. An example of a special message indicating a destination electronic mail address for receiving the retrieved information is "HPRETRIEVECONTACT:1234:John:leeyy@abc.com". While additional steps like dialing to an Internet Service Provider may be needed, they can be automatically implemented as known to a person skilled in the art.

In the foregoing description, a special SMS message for retrieving contact information has a format "HPRETRIEVECONTACT:[OS-password][Name of contact][Destination]". A blank [Destination] returns the retrieved information to the sender of the special SMS message. Optionally, [Destination] may contain an electronic mail address for sending the retrieved information as an electronic mail message. Optionally, [Destination] may contain destination phone numbers, or electronic mail addresses, or a combination of both. Further examples of special SMS messages for other retrieval tasks include (1) "HPRETRIEVECALENDAR:[OS-password][Date in mm/dd/yy][Destination]" for retrieving calendar information of a particular date, where [Date in mm/dd/yy] is a source identifier parameter identifying a source from which information is to be retrieved; and (2) "HPRETRIEVEFILE:[OS-password)][Pathname or Filename][Destination]" for retrieving particular files, where [Pathname or Filename] is a source identifier parameter identifying a source or location or filename for the task.

Since the present invention allows a variety of tasks to be performed by a remote user, the special SMS message formats may be stored in wireless phones or PDAs in the same manner as existing SMS message templates. Further, the special SMS message formats may also be accessed by a user of a web site which offers SMS messages text messaging services. Optionally, a program may be installed in the wireless devices to manage the list of tasks available and to provide a user interface.

In the present invention, all incoming SMS messages are stored in the Pocket Inbox application so that a user may track all incoming special messages regardless whether the task has been performed or has failed.

In the present invention, a special SMS message may be sent from a wireless phone, or a wireless PDA, or computing devices capable of sending and receiving SMS, or from a web site providing SMS messages text messaging services. Similarly, the receiving device may be any like devices capable of at least receiving SMS messages and/or electronic mail messages.

What is claimed is:

1. A method of performing a task in a wireless device having a wireless module and a computing module, comprising the steps of:

receiving a Short Message Service (SMS) message by the wireless module;

passing the SMS message to the computing module;

ascertaining a presence or absence of a predetermined header in the SMS message;

validating a user-input password parameter in the SMS message; and performing a task by the computing module according to contents in the predetermined header.

2. The method according to claim 1, wherein performing the task includes password-locking the computing module.

3. The method according to claim 1, wherein validating a user-input password parameter further comprises validating a user-input source parameter.

4. The method according to claim 3, wherein performing the task includes retrieving information from a source indicated by the user-input source parameter.

5. The method according to claim 4, wherein performing the task includes sending the retrieved information by SMS to a sender of the SMS message or to a destination predefined in the SMS message or to both.

6. The method according to claim 4, wherein performing the task includes sending the retrieved information by electronic mail to a destination predefined in the SMS message.

7. A device having wireless and computing capabilities comprising:

a wireless module that receives a Short Message Service (SMS) message; and a computing module that receives the SMS message from the wireless module, ascertains a presence or absence of a predetermined header in the SMS message, validates a user-input password parameter in the SMS message, and performs a task according to contents in the predetermined header.

8. The device according to claim 7, wherein the task includes password-locking the computing module.

9. The device according to claim 7, wherein the computing module further validates a user-input source parameter.

10. The device according to claim 9, wherein the computing module performs a task which includes retrieving information from a source indicated by the user-input source parameter.

11. The device according to claim 10, wherein the computing module sends the retrieved information by SMS to a sender of the SMS message or a destination predefined in the SMS message or to both.

12. The device according to claim 10, wherein the computing module sends the retrieved information by electronic mail to a destination predefined in the SMS message.

* * * * *